US009743367B2

United States Patent
Das et al.

(10) Patent No.: US 9,743,367 B2
(45) Date of Patent: Aug. 22, 2017

(54) LINK LAYER DISCOVERY PROTOCOL (LLDP) ON MULTIPLE NODES OF A DISTRIBUTED FABRIC

(71) Applicant: Lenovo Enterprise Solutions (Singapore) Pte. Ltd., Singapore (SG)

(72) Inventors: Nirmalendu Das, Cupertino, CA (US); Mark Q. Llacuna, Milpitas, CA (US); Ravichandra B. Ryali, San Jose, CA (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 212 days.

(21) Appl. No.: 14/490,609

(22) Filed: Sep. 18, 2014

(65) Prior Publication Data

US 2016/0088578 A1    Mar. 24, 2016

(51) Int. Cl.
| | | |
|---|---|---|
| *H04W 56/00* | (2009.01) | |
| *H04L 29/08* | (2006.01) | |
| *H04L 12/24* | (2006.01) | |
| *H04L 12/947* | (2013.01) | |

(52) U.S. Cl.
CPC .......... *H04W 56/001* (2013.01); *H04L 41/12* (2013.01); *H04L 69/324* (2013.01); *H04L 49/25* (2013.01); *Y02B 60/43* (2013.01)

(58) Field of Classification Search
CPC ......... Y02B 60/43; H04L 41/12; H04L 45/02; H04L 45/42; H04L 49/25; H04L 45/26
USPC .......................... 370/254, 392; 709/224, 223
See application file for complete search history.

(56) References Cited

U.S. PATENT DOCUMENTS

| | | | | |
|---|---|---|---|---|
| 7,756,027 B1 * | 7/2010 | Reddy | ................ | H04L 41/0806 370/230 |
| 2008/0189769 A1 * | 8/2008 | Casado | ............... | G06F 21/6281 726/4 |
| 2012/0236757 A1 * | 9/2012 | Klein | ..................... | H04L 41/12 370/255 |
| 2013/0108263 A1 * | 5/2013 | Srinivas | ............... | H04Q 3/0083 398/45 |
| 2013/0170336 A1 * | 7/2013 | Chen | ...................... | H04L 41/12 370/221 |

(Continued)

FOREIGN PATENT DOCUMENTS

CN          102082710          6/2011

*Primary Examiner* — Charles C Jiang
*Assistant Examiner* — Will Lin
(74) *Attorney, Agent, or Firm* — Zilka-Kotab, P.C.

(57) ABSTRACT

In one embodiment, a method for providing link layer discovery protocol (LLDP) to a distributed fabric includes sending a neighbor synchronization request message from a master node to one or more member nodes connected to the master node, the neighbor synchronization request message including a request for a recipient member node to send its LLDP neighbor information to the master node, receiving a neighbor synchronization update message at the master node from at least one of the one or more member nodes, the neighbor synchronization update message including information about local LLDP neighbors of the one or more member nodes, and storing the information about the local LLDP neighbors from the at least one of the one or more member nodes in a LLDP neighbors database of the master node.

20 Claims, 7 Drawing Sheets

(56) References Cited

U.S. PATENT DOCUMENTS

| | | | |
|---|---|---|---|
| 2013/0176900 A1* | 7/2013 | Jogadhenu | H04L 12/2809 370/255 |
| 2013/0227558 A1* | 8/2013 | Du | G06F 9/45558 718/1 |
| 2014/0129853 A1* | 5/2014 | Diab | H04L 12/413 713/310 |
| 2014/0169155 A1* | 6/2014 | Li | H04L 12/42 370/223 |
| 2014/0198647 A1* | 7/2014 | Chowdhury | H04L 47/125 370/235 |
| 2014/0280143 A1* | 9/2014 | Milenova | G06F 17/30705 707/737 |
| 2015/0003259 A1* | 1/2015 | Gao | H04L 45/18 370/244 |
| 2015/0023213 A1* | 1/2015 | Soneda | H04W 40/32 370/254 |
| 2015/0200852 A1* | 7/2015 | Solis | H04L 45/7453 370/328 |
| 2015/0304164 A1* | 10/2015 | Goetje | H04L 41/0806 370/255 |
| 2016/0021032 A1* | 1/2016 | Maier | H04L 49/70 370/401 |
| 2016/0099868 A1* | 4/2016 | Tan | H04L 12/6418 370/392 |

* cited by examiner

LINK LAYER DISCOVERY PROTOCOL (LLDP) ON MULTIPLE NODES OF A DISTRIBUTED FABRIC

BACKGROUND

The present invention relates to data center infrastructure, and more particularly, this invention relates to implementing link layer discovery protocol (LLDP) on multiple nodes of a distributed fabric networking system.

LLDP is a useful tool in network infrastructure recognition and intercommunications. It is a link layer protocol encompassed by the Internet Protocol Suite used by network devices for advertising their identity, capabilities, and nearest neighbors on a local area network (LAN) that adheres to Institute of Electronics and Electrical Engineers (IEEE) 802. In the context of a distributed fabric, LLDP may be used to exchange information between any of the devices in the distributed fabric, which appears as a single logical switch.

However, since LLDP relies on protocol data units (PDUs) to exchange information between connected networking devices, as more and more networking devices are included in the distributed fabric, scaling becomes an issue. Current solutions centralize the management of LLDP on a master node of the fabric, and this does not scale effectively as all the PDUs sent back and forth between the various networking devices are processed and generated on a single processor. As the size of the distributed fabric grows ever larger, and more LLDP neighbors are attached and announce their existence to the fabric, the master node's processor is unable to cope with the increased load on its limited resources. Centralizing the LLDP management on the master node also constrains other protocols that are dependent on LLDP, such as Data Center Bridging Capabilities Exchange (DCBX) protocol, Channel Discovery and Configuration Protocol (CDCP), etc., in their implementations, usage, and effectiveness.

SUMMARY

In one embodiment, a distributed fabric includes a master node connected to one or more member nodes, each node including a local processor configured to manage a link layer discovery protocol (LLDP) neighbors database, the LLDP neighbors database being configured to store information regarding networking devices in the distributed fabric, and a switching processor configured to receive and send packets, wherein each of the one or more member nodes is configured to receive a neighbor synchronization request message from the master node and send a neighbor synchronization update message to the master node, the neighbor synchronization update message including information about local LLDP neighbors of the member node, and wherein the master node is configured to receive the neighbor synchronization update messages from each of the one or more member nodes and send the neighbor synchronization request message to each of the one or more member nodes, the neighbor synchronization request message including a request for a recipient member node to send its LLDP neighbor information to the master node.

In another embodiment, a method for providing LLDP to a distributed fabric includes sending a neighbor synchronization request message from a master node to one or more member nodes connected to the master node, the neighbor synchronization request message including a request for a recipient member node to send its LLDP neighbor information to the master node, receiving a neighbor synchronization update message at the master node from at least one of the one or more member nodes, the neighbor synchronization update message including information about local LLDP neighbors of the one or more member nodes, and storing the information about the local LLDP neighbors from the at least one of the one or more member nodes in a LLDP neighbors database of the master node.

In another embodiment, a master node including a local processor configured to manage a LLDP neighbors database, the LLDP neighbors database being configured to store information regarding networking devices in a distributed fabric, receive neighbor synchronization update messages from one or more member nodes in the distributed fabric, each neighbor synchronization update message including information about local LLDP neighbors of the one or more member nodes, send a neighbor synchronization request message to the one or more member nodes, the neighbor synchronization request message including a request for a recipient member node to send its LLDP neighbor information to the master node, and update the LLDP neighbors database with the LLDP neighbor information included in each neighbor synchronization update message received from one of the one or more member nodes, and a switching processor configured to receive and send packets, receive protocol data units (PDUs), and redirect the PDUs to the local processor for handling, wherein the neighbor synchronization request message is sent by the master node periodically and/or when one or more inconsistencies are determined between incoming updates and the LLDP neighbors database of the master node.

Other aspects and embodiments of the present invention will become apparent from the following detailed description, which, when taken in conjunction with the drawings, illustrate by way of example the principles of the invention.

DETAILED DESCRIPTION

Figure 1:
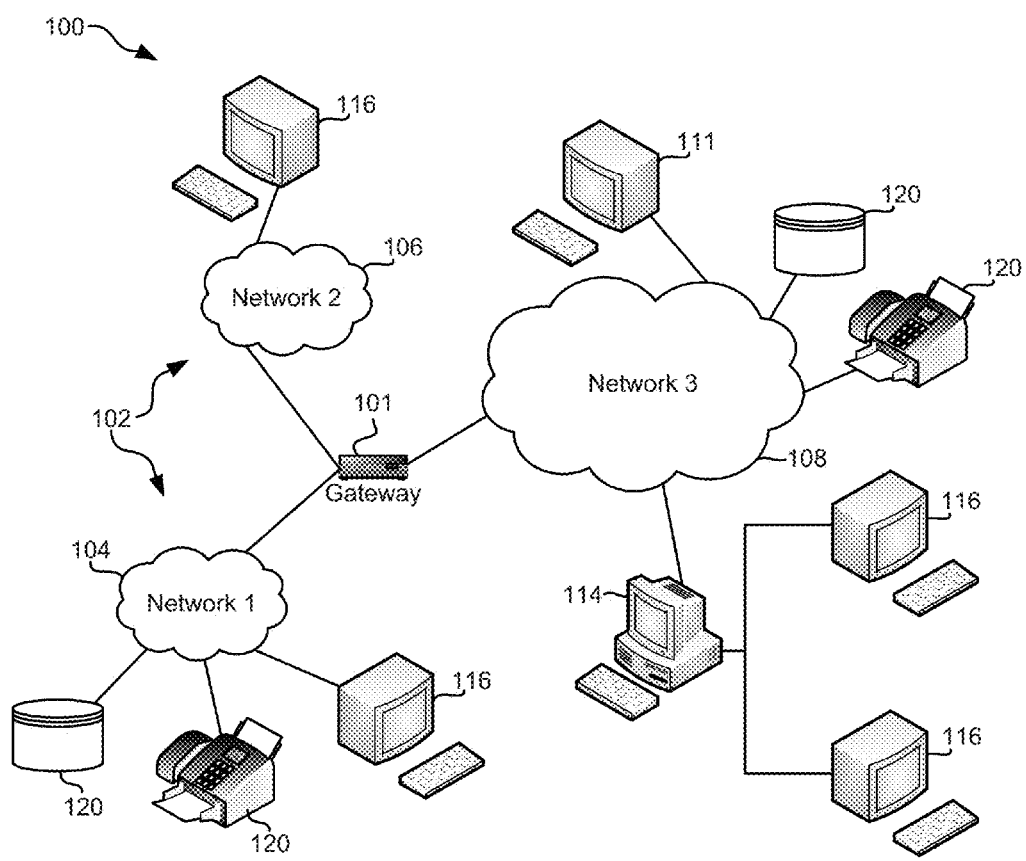
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

The following description discloses several preferred embodiments of systems, methods and computer program products for overcoming the problem of scaling Link Layer Discovery Protocol (LLDP) across a distributed fabric by distributing the management of LLDP on multiple nodes of the distributed fabric while still presenting a unified view to northbound applications.

In one general embodiment, a distributed fabric includes a master node connected to one or more member nodes, each node including a local processor configured to manage a LLDP neighbors database, the LLDP neighbors database being configured to store information regarding networking devices in the distributed fabric, and a switching processor configured to receive and send packets, wherein each of the one or more member nodes is configured to receive a neighbor synchronization request message from the master node and send a neighbor synchronization update message to the master node, the neighbor synchronization update message including information about local LLDP neighbors of the member node, and wherein the master node is configured to receive the neighbor synchronization update messages from each of the one or more member nodes and send the neighbor synchronization request message to each of the one or more member nodes, the neighbor synchronization request message including a request for a recipient member node to send its LLDP neighbor information to the master node.

In another general embodiment, a method for providing LLDP to a distributed fabric includes sending a neighbor synchronization request message from a master node to one or more member nodes connected to the master node, the neighbor synchronization request message including a request for a recipient member node to send its LLDP neighbor information to the master node, receiving a neighbor synchronization update message at the master node from at least one of the one or more member nodes, the neighbor synchronization update message including information about local LLDP neighbors of the one or more member nodes, and storing the information about the local LLDP neighbors from the at least one of the one or more member nodes in a LLDP neighbors database of the master node.

In another general embodiment, a master node including a local processor configured to manage a LLDP neighbors database, the LLDP neighbors database being configured to store information regarding networking devices in a distributed fabric, receive neighbor synchronization update messages from one or more member nodes in the distributed fabric, each neighbor synchronization update message including information about local LLDP neighbors of the one or more member nodes, send a neighbor synchronization request message to the one or more member nodes, the neighbor synchronization request message including a request for a recipient member node to send its LLDP neighbor information to the master node, and update the LLDP neighbors database with the LLDP neighbor information included in each neighbor synchronization update message received from one of the one or more member nodes, and a switching processor configured to receive and send packets, receive protocol data units (PDUs), and redirect the PDUs to the local processor for handling, wherein the neighbor synchronization request message is sent by the master node periodically and/or when one or more inconsistencies are determined between incoming updates and the LLDP neighbors database of the master node.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
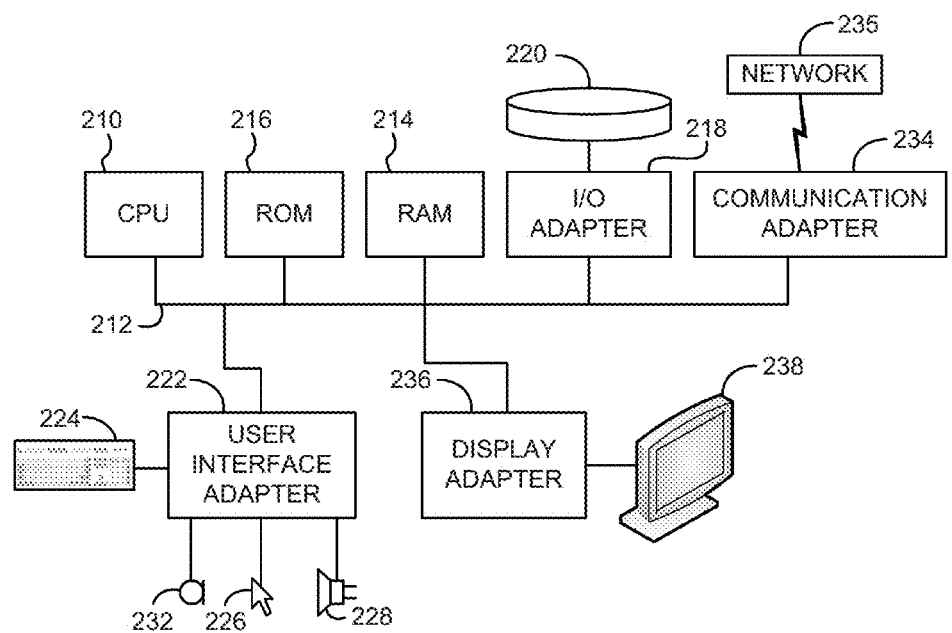
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Several advantages are produced by distributing the management of LLDP across multiple nodes in a distributed fabric, including scalability of the LLDP across a very large fabric. The various known LLDP management solutions cannot scale beyond a certain point due to the number of protocol data units (PDUs) that must be processed by the master node. The master node of the distributed fabric is configured to provide configuration and management of the networking components, such as through a management IP interface of the master node, in order to control flows of traffic through the distributed fabric. This limited processing of PDUs is acceptable to some administrators which utilize a fabric of limited size, but the paradigm has changed recently where a Layer-2 (L2) fabric may now be massively distributed, considering the increased capabilities provided by increased link speeds. Therefore, when more than a single processor on the master node may be used to process the PDUs, LLDP management may be distributed while nevertheless presenting a unified view of the LLDP information to northbound applications by using a time/event based synchronization of the neighbors database and state-machine information between member nodes and a master node of the fabric. Northbound applications may include any applications sending and/or receiving information from higher level or lower level networking devices, as would be known by one of skill in the art, such as command line interface (CLI), simple network management protocol (SNMP), etc. All external-facing applications, which include any such external-facing application known in the art, such as CLI/SNMP, may remain completely agnostic to the underlying implementation, thus making the implementation of LLDP on multiple nodes minimally disruptive.

Figure 3:
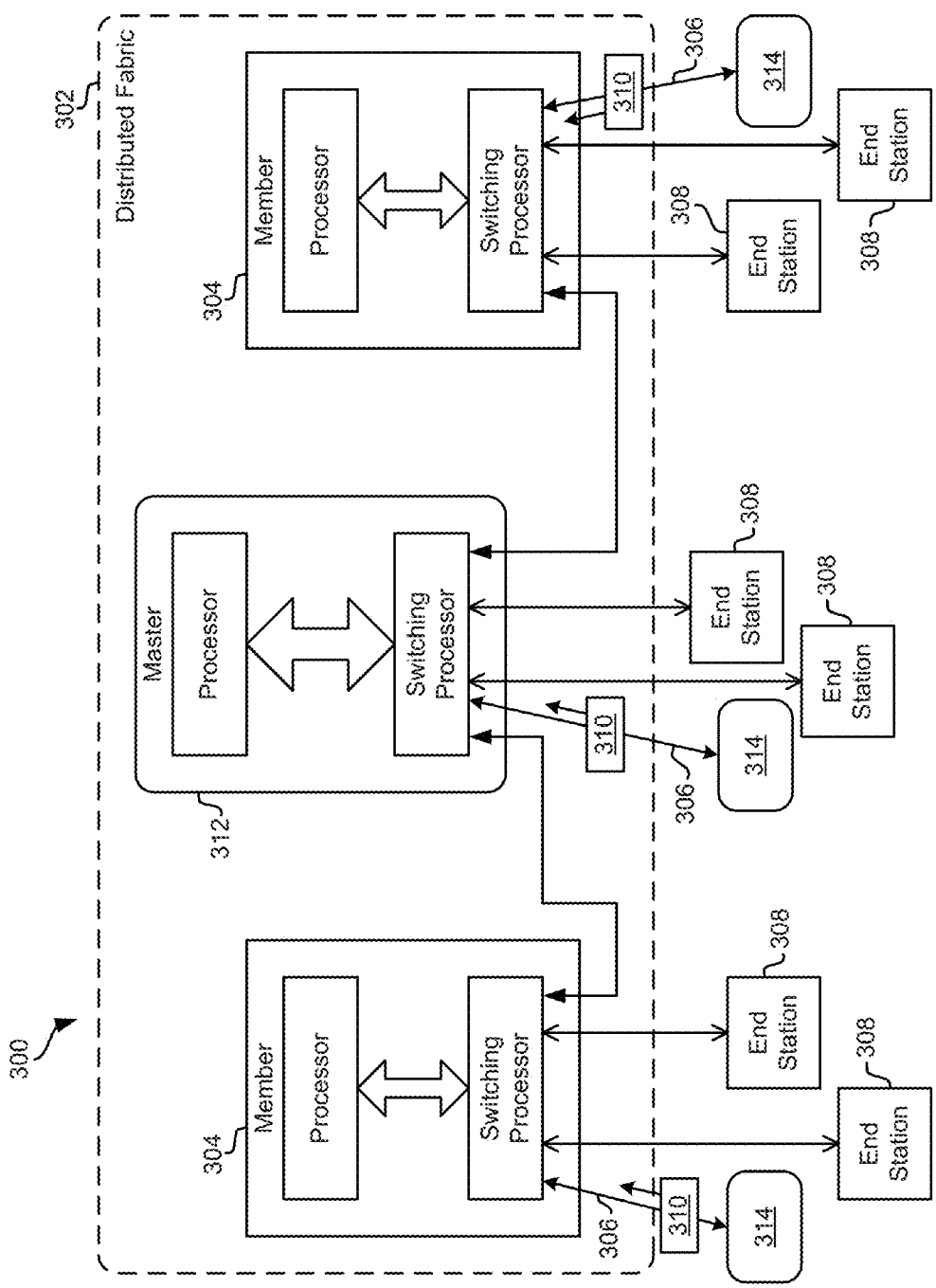
FIG. 3 is a simplified diagram of a system having a distributed fabric, according to one embodiment.

Now referring to FIG. 3. LLDP is described in reference to a system 300. LLDP is a vendor-neutral protocol used by network devices to advertise their identity and capabilities, among other useful information. The usage of LLDP is limited to a single link 306 connecting two network devices, which may L2/multi-layer switches 304 or some other networking devices. In other words, a PDU 310 which encapsulates all the information that the protocol is configured to advertise does not propagate beyond the network devices at either end of the single link 306, such as network device 314 and physical switch 304, end station 308 and master node 312, etc.

A L2 distributed fabric 302 is considered to be distributed when a group of physical switches 304 act as one big logical switch by sharing their forwarding tables or forwarding information bases (FIBs), thus presenting a unified data plane to the various connected end stations 308. The links 306 may be Ethernet links or any other proprietary link known in the art, and connect these physical switches 304 such that they may serve as a backplane of the created logical switch. Though it is not necessary to have a hierarchy among these physical switches 304, it is common practice to have a master node 312 to provide the management plane of the logical switch. All the external entities communicate with the master node 312 to configure/query the logical switch.

One common implementation of LLDP is to centralize the management of LLDP on the master node 312 which means only one effective LLDP instance is running for the whole distributed fabric 302. Though this is a rather simple and straight-forward solution to a complex problem, one of the biggest drawbacks of this approach is its inability to scale as per the size of the fabric 302. Considering that a massively distributed fabric may be built because of ever-increasing link 306 speeds, this implementation will severely limit the scale of LLDP itself. Usually, such an implementation is effected by redirecting the LLDP PDUs 310 to the master node 312 via installation of access control lists (ACLs), or some other suitable mechanism known in the art, on all the other switches 304 (nodes) of the fabric 302.

All the dependent protocols, e.g., Data Center Bridging Capabilities Exchange (DCBX) protocol, Channel Discovery and Configuration Protocol (CDCP), etc., which rely on LLDP are constrained to being performed only in a centralized manner when LLDP itself is not distributed across the various nodes. Though it is not impossible to distribute the dependent protocols when LLDP is centralized, the implementation of a dependent protocol will become that much more complicated and decrease efficiency.

Figure 4:
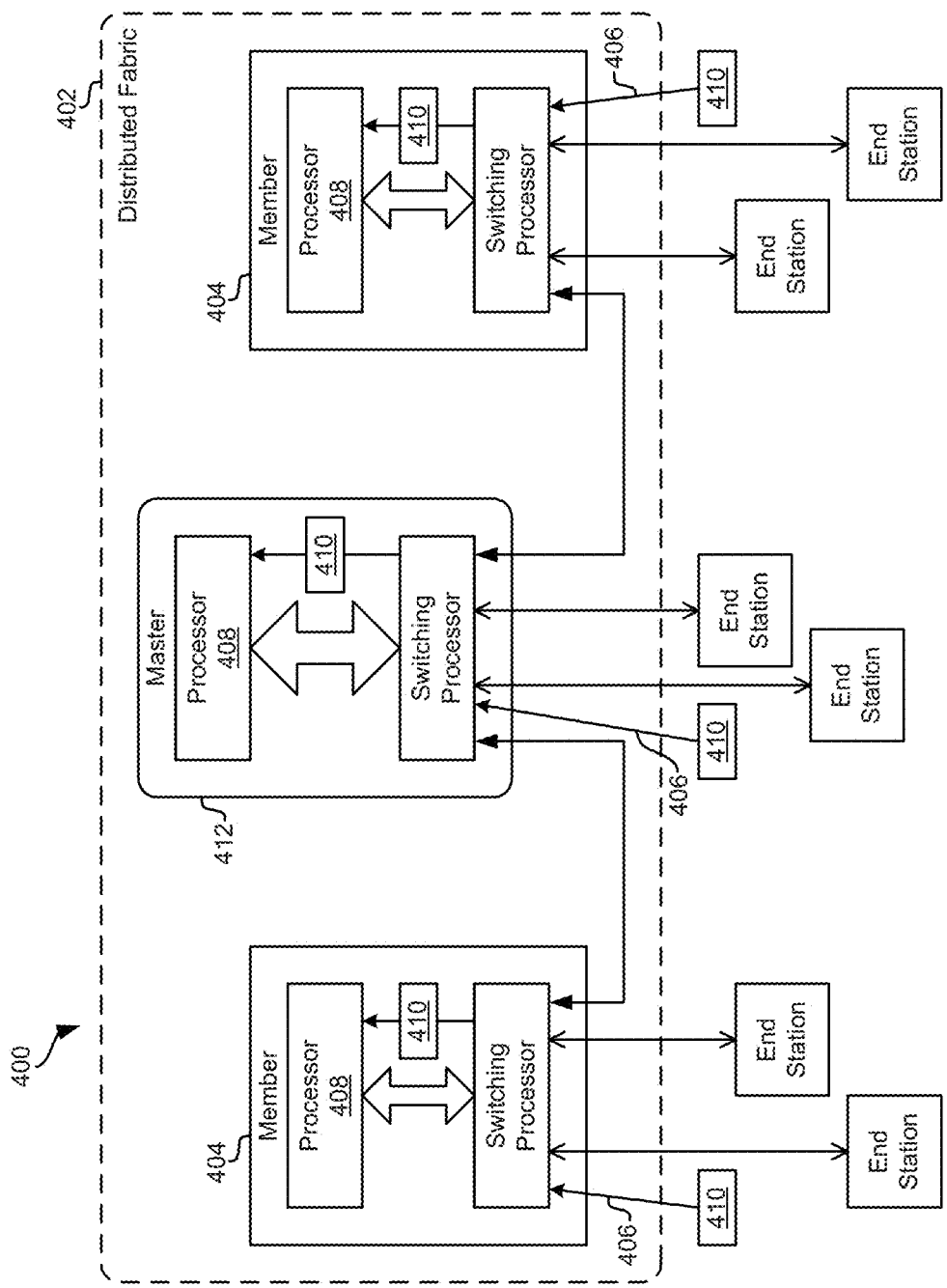
FIG. 4 is a simplified diagram of a system having a distributed fabric, according to another embodiment.

Therefore, a distributed implementation of LLDP is proposed which makes it easily scalable on a multi-node fabric 402 as shown in FIG. 4. The advantages are obvious. The processing power of the processors 408 on all the various nodes 404, 412 are taken advantage of, which results in better utilization of those nodes 404, 412, and a lessened load on the processor 408 of the master node 412, which typically is over-burdened to begin with due to being required to provide the management plane of the fabric 402, and possibly a significant portion (greater than 25% or even 50%) of the control plane of the fabric 402.

An effective approach to solve the scalability issue on a distributed fabric 402 is to execute LLDP instances on more than one, some, or all of the nodes 404 of the fabric 402. Each node 404 may be a physical switch, a router, or some other networking device known in the art capable of L2 communications across physical links 406 between networking devices. Each LLDP instance is configured to process incoming PDUs 410, discover, update, and delete neighbor nodes (neighbors) that are directly and physically connected to that node 404, and generate outgoing PDUs 410, when appropriate. To implement this approach, an ACL, or some other suitable mechanism known in the art, may be programmed in the hardware of each node 404 to redirect the PDUs 410 to the local processor 408. Any processor known in the art may be used, such as a CPU, FPGA, ASIC, etc.

Strictly from a LLDP point-of-view, this operation acts as a working implementation of LLDP, but would not result in a unified view of the protocol's state being presented, nor the neighbors database being presented to northbound applications, like CLI, SNMP or any other external management station as would be understood by one of skill in the art. To address this desired configuration, a synchronization mechanism may be implemented between the member nodes 404 and the master node 412. This synchronization mechanism involves the creation of a set of messages as described in more detail herein.

A first message that may be included in the set of messages for implementation of the synchronization mechanism is referred to as a "Neighbor Synchronization Update" message. These Neighbor Synchronization Update messages are sent from a member node 404 to the master node 412 and include information about the member node's local LLDP neighbors (LLDP neighbors are the external network entities physically connected to the switching processor of the member node 404) These Neighbor Synchronization Update messages may be sent during and/or after a change occurs in the local LLDP neighbors database in one embodiment. In another embodiment, these Neighbor Synchronization Update messages may be sent periodically, such as every 15 seconds, 30 seconds, 60 seconds, 90 seconds, etc., to update the time-to-live (TTL) value of the local LLDP neighbors. These Neighbor Synchronization Update messages may be sent as a collection of <T,R> records, where T indicates the type of update, and R indicates the corresponding record.

In one embodiment, T in the <T,R> tuple may take any of the following values: Update, Delete, and TTL Update, which may be represented by some bit value, as would be understood by one of skill in the art. A T value of Update indicates a neighbor update. This may be used to represent a new neighbor or an update to any field (other than TTL) of the neighbor. The value of R, when T has a value of Update, is the data which will be encapsulating all of the information associated with that neighbor.

In another embodiment, a T value of Delete indicates a neighbor deletion from the local LLDP neighbors database. When T has a value of Delete, R will indicate the index of the neighbor.

In another embodiment, a T value of TTL Update indicates a special update situation, because this update is used to indicate discovery of a neighbor, and occurs most often. Since this represents the most common and most frequent update, creating a new type for this message, and just sending the minimal set of information to the master node to update the TTL field of the corresponding neighbor, is a more efficient implementation than using the standard Update message type.

Another message that may be included in the set of messages for implementation of the synchronization mechanism is referred to as a "Neighbor Synchronization Request" message. A Neighbor Synchronization Request message is sent from the master node 412 to one or more member nodes 404, and is a request for the member node 404 to send its LLDP neighbor information. Neighbor Synchronization Request messages may be sent periodically, e.g., every 60 seconds, 90 seconds, 120 seconds, 150 seconds, etc., and/or they may be sent when the master node 412 determines one or more inconsistencies between the incoming updates and the LLDP neighbors database it maintains. Requests will go as a collection of <I, H> records, where I is an identifier of the neighbor, and H indicates a hash generated for that neighbor. Member nodes 404 are configured to regenerate the hash for that corresponding neighbor, and determine whether to send an update to the master node 412.

Another message that may be included in the set of messages for implementation of the synchronization mechanism is referred to as a "LLDP Rx/Tx Update" message, where Rx/Tx stands for reception/transmission. This message is used so that the state machine updates from the member nodes 404 to the master node 412. Reception and transmission sides of the LLDP utilize their own state machines which might be queried by northbound applications. These queries may be used for information gathering and troubleshooting purposes. Synchronization messages of this category may be sent periodically, such as every 60 seconds, 90 seconds, 120 seconds, 150 seconds, etc. The periodic interval may be adjusted to suit any given context and situation. Northbound applications like CLI/SNMP may either query the master node or configure the master node to set protocol parameters, like LLDP protocol time intervals, etc.

Yet another possible message that may be included in the set of messages for implementation of the synchronization mechanism is a "LLDP Statistics Update" message that is configured to be sent from the member nodes 404 to the master node 412. This LLDP Statistics Update message may be sent periodically, such as every 60 seconds, 90 seconds, 120 seconds, 150 seconds, etc. Again, this periodic interval may be adjusted to suit any given context and situation. This message is configured to include certain statistics about LLDP neighbors for each of the member nodes, an example of which is the number of neighbors added since the protocol initiated.

In one embodiment, the master node 412 may comprise a local processor 408 configured to manage a LLDP neighbors database, the LLDP neighbors database being configured to store information regarding networking devices in a distributed fabric, receive neighbor synchronization update messages from one or more member nodes 404 in the distributed fabric 402, each neighbor synchronization update message comprising information about local LLDP neighbors of the particular member node 404 which sent the neighbor synchronization update message, send a neighbor synchronization request message to the one or more member nodes 404, the neighbor synchronization request message comprising a request for a recipient member node to send its LLDP neighbor information to the master node 412, and update the LLDP neighbors database with the LLDP neighbor information included in each neighbor synchronization update message received from one of the one or more member nodes 404.

The master node 412 may also include a switching processor configured to receive and send packets, receive PDUs 410 from other devices in and out of the distributed fabric 402, and redirect the PDUs 410 to the local processor 408 for handling. The neighbor synchronization request message is sent by the master node 412 periodically and/or when one or more inconsistencies are determined between incoming updates and the LLDP neighbors database of the master node 412.

According to another embodiment, each of the member nodes 404 may comprise a local processor 408 configured to manage a LLDP neighbors database, the LLDP neighbors database being configured to store information regarding LLDP neighbor devices to the member node 404 in the distributed fabric 402, send neighbor synchronization update messages to the master node 412 in the distributed fabric 402, the neighbor synchronization update message comprising information about local LLDP neighbors of the member node 404, and receive a neighbor synchronization request message from the master node 412, the neighbor synchronization request message comprising a request for the member node 404 to send its LLDP neighbor information to the master node 412.

Each member node 404 may also comprise a switching processor configured to receive and send packets, receive PDUs 410 from devices outside of the distributed fabric 402, and redirect the PDUs 410 to the local processor 408 for handling instead of sending the PDUs 410 to the master node 412. The neighbor synchronization update messages are sent by the member nodes 404 periodically, during a change in the LLDP neighbors database of the member node 404, and/or after the change occurs in the LLDP neighbors database of the member node 404.

Figure 5:
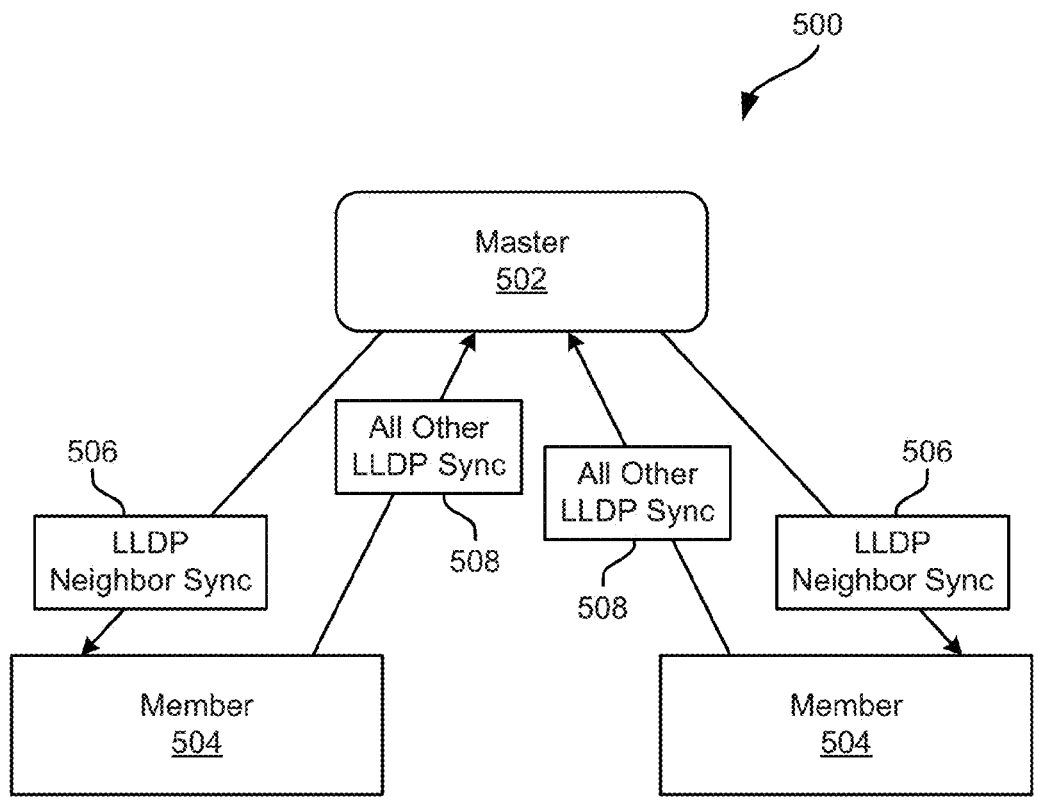
FIG. 5 shows a simplified distributed fabric having a master node and member nodes illustrating link layer discovery protocol (LLDP) synchronization message exchange between the nodes, according to one embodiment.

Now referring to FIG. 5, a simplified distributed fabric 500 is shown having a master node 502 and two member nodes 504, with the communication flow therebetween being shown according to one embodiment. As shown, LLDP Neighbor Synchronization Request messages 506 are sent from the master node 502 to the member nodes 504. All other LLDP Synchronization messages 508 are sent from the member nodes 504 to the master node 502.

Figure 6:
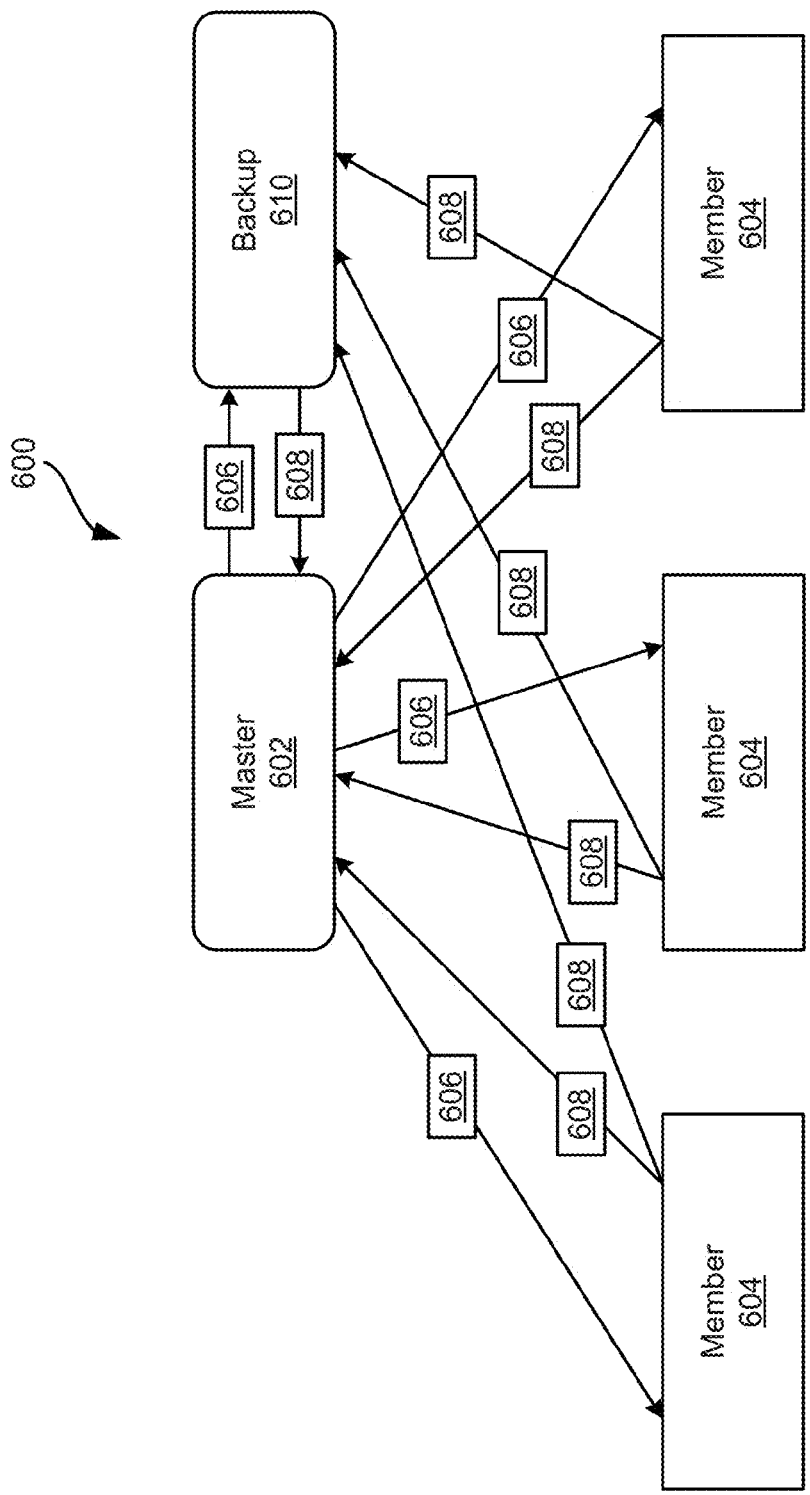
FIG. 6 shows a simplified distributed fabric having a master node, a backup node, and member nodes, according to one embodiment.

Now referring to FIG. 6, for redundancy purposes, a distributed fabric 600 may include a backup node 610 which will take over in place of the master node 602 in case the original master node 602 fails. This is to provide high availability of the fabric 600 as a whole. In such a scenario, the member nodes 604 send all other LLDP Synchronization messages 608 (besides LLDP Neighbor Synchronization Request messages) to both the master node 602 and the backup node 610, while LLDP Neighbor Synchronization Request messages 606 are only sent from the master node 602 to the member nodes 604. In addition, LLDP Neighbor Synchronization Request messages 606 are sent from the master node 602 to the backup node 610, and the backup node 610 sends all other LLDP Synchronization messages 608 to the master node 602.

Another approach to run LLDP on multiple nodes of a distributed fabric is to have a lightweight client on each node, except the master node. In such an implementation, each member node is configured to act as a relay agent of the incoming PDUs. It is also configured to generate a hash for the incoming PDU on a given port, and when this hash matches the hash of the previous PDU on the same port, it consumes that PDU but just sends a TTL update message to the master node. The transmission side of the protocol may be implemented as described previously.

One advantage of such an implementation is a lesser need of synchronization between the member nodes and master node. This approach may be considered to be a hybrid of a fully centralized model and a fully distributed model. When a PDU that is relayed from a member node to the master node does not reach the master node because of congestion or any other reason, this approach does not provide an efficient error-recovery mechanism. However, this issue may be overcome by storing a copy of the original PDU, and resending the PDU when the member node does not receive an acknowledgement within a given time-frame.

In another embodiment, each of the member nodes may be configured to selectively relay PDUs to the master node, based on any criteria deemed helpful in determining whether to relay the PDUs, such as uniqueness, timestamp, frequency of PDU repeatedly being received/sent, type of PDU, whether the PDU includes new or old information, etc. By uniqueness, what is meant is that only one PDU that signifies certain information need be sent to the master node, while other PDUs which repeat that information need not be sent to the master node. In addition, a PDU which specifies that no changes have taken place since a last PDU being sent also does not need to be forwarded to the master node, as the information that the master node has will not have changed.

The master node is only relieved of the transmission portion of the LLDP load of member nodes. It still implements all the reception processing logic which is where a majority of the workload of the LLDP is performed.

Figure 7:
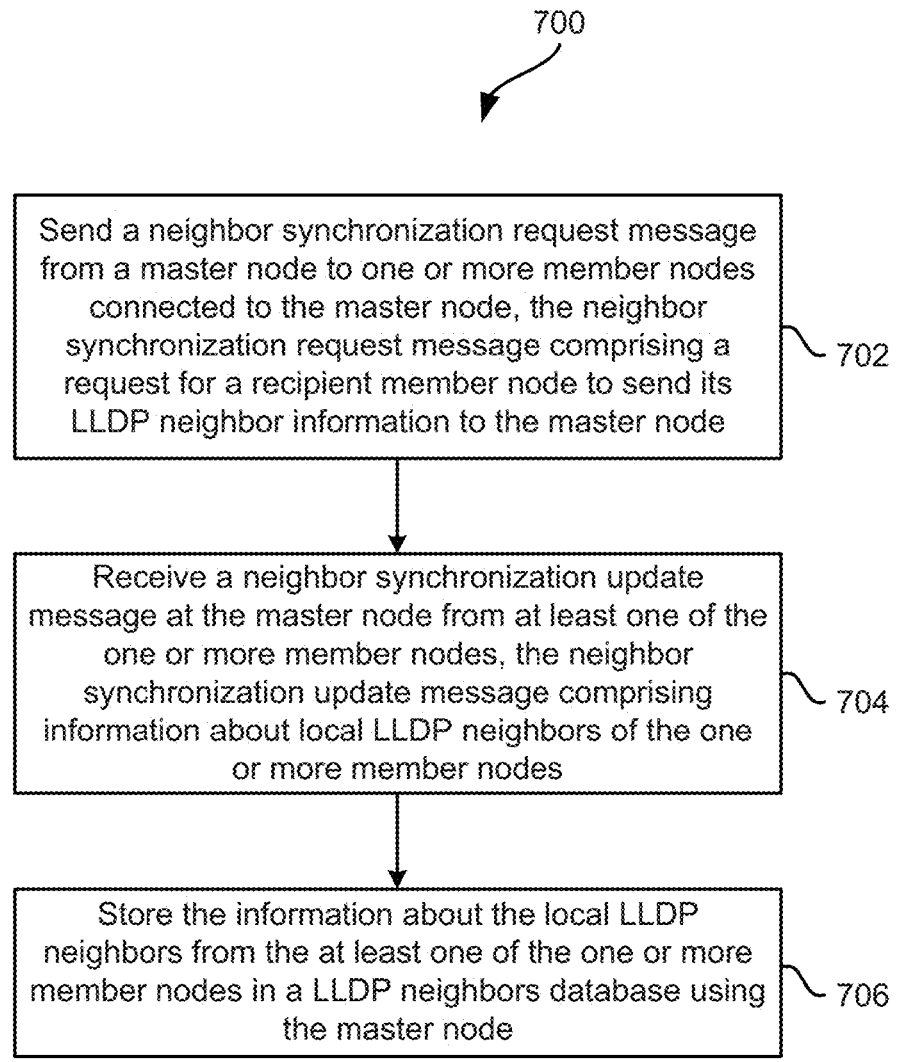
FIG. 7 is a flowchart of a method, according to one embodiment.

Now referring to FIG. 7, a flowchart of a method 700 for providing LLDP to a distributed fabric is shown according to one embodiment. The method 700 may be performed in accordance with the present invention in any of the environments depicted in FIGS. 1-6, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a member node, a master node, a distributed fabric, a networking device, a processor, or some other device having one or more processors therein, and combinations thereof. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where a neighbor synchronization request message is sent from a master node to one or more member nodes connected to the master node. The neighbor synchronization request message comprises a request for a recipient member node to send its LLDP neighbor information to the master node, LLDP neighbor information possibly including identity, address, type, or any other information as would be known to one of skill in the art.

In operation 704, a neighbor synchronization update message is received at the master node from at least one of the one or more member nodes. The neighbor synchronization update message comprises information about local LLDP neighbors of the one or more member nodes.

In operation 706, the information about the local LLDP neighbors from the at least one of the one or more member nodes is stored in a LLDP neighbors database of the master node. The LLDP neighbors database may be a table, list, or some other suitable storage data construct known in the art.

According to one embodiment, the neighbor synchronization update message may be received by the master node periodically, during a change in a local LLDP neighbors database of the at least one of the one or more member nodes, and/or in response to the change occurring in the local LLDP neighbors database of the at least one of the one or more member nodes. Of course, other triggers may cause the neighbor synchronization update message to be sent by the member node(s) to be received by the master node as would be appreciated by one of skill in the art.

In a further embodiment, the neighbor synchronization update message may comprise a collection of <T,R> records, where T indicates a type of update, and R indicates a corresponding record to update in the LLDP neighbors database of the master node.

According to another embodiment, the neighbor synchronization request message may be sent by the master node periodically and/or when one or more inconsistencies are determined between incoming updates and the LLDP neighbors database of the master node. Of course, other triggers may cause the neighbor synchronization request message to be sent by the master node to be received by the member node(s) as would be appreciated by one of skill in the art.

In a further embodiment, the neighbor synchronization request message may comprise a collection of <I, H> records, where I is an identifier of a neighbor to one of the member nodes, and H indicates a hash generated for that corresponding neighbor. Furthermore, each of the one or more member nodes may determine whether to send an update to the master node based on a comparison between the hash and a regenerated hash, such that when the hashes match, the update is not sent, and when the hashes differ, the update is sent, since different hashes indicate different information.

In one embodiment, method 700 may further include receiving LLDP Rx/Tx query messages originated from one or more northbound applications in order to gather information about other LLDP neighbors from the LLDP neighbors database of the master node. This gathered information may be used by the northbound applications in any way they see fit, as would be understood by one of skill in the art. The information may include identity, location, address(es), etc., of the LLDP neighbors.

In yet another embodiment, method 700 may further include receiving, at the master node, one or more LLDP statistics update messages from the one or more member nodes, the one or more LLDP statistics update messages including statistics about LLDP neighbors of the one or more member nodes. These statistics may include number of neighbors added, deleted, or aged out, last update time of the neighbors table, number of PDU drops or any other useful statistics known to those of skill in the art.

In another further embodiment, method 700 may include distributing PDUs to the local processor for handling instead of sending all PDUs to the master node. In this way, managing PDUs may be truly distributed across the various nodes of the distributed fabric, thereby relieving processing load on the master node and allowing for increased scalability of the fabric.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A distributed fabric, comprising:
  a master node connected to one or more member nodes, each node comprising:
    a local processor configured to manage a link layer discovery protocol (LLDP) neighbors database, the LLDP neighbors database being configured to store information regarding networking devices in the distributed fabric; and
    a switching processor configured to receive and send packets,
  wherein each of the one or more member nodes is configured to:
    receive a neighbor synchronization request message from the master node;
    send a neighbor synchronization update message to the master node, the neighbor synchronization update message comprising information about local LLDP neighbors of the member node; and
    send a LLDP statistics update message to the master node, the LLDP statistics update message comprising statistics about LLDP neighbors of the one or more member nodes, wherein the statistics include a number of neighbors added for the one or more member nodes since initiation of LLDP in the distributed fabric, and
  wherein the master node is configured to:
    receive the neighbor synchronization update messages from each of the one or more member nodes; and
    send the neighbor synchronization request message to each of the one or more member nodes, the neighbor synchronization request message comprising a request for a recipient member node to send its LLDP neighbor information to the master node.

2. The distributed fabric as recited in claim 1, wherein the neighbor synchronization update message is sent by each of the one or more member nodes periodically, and during or after a change in a local LLDP neighbors database of the member node.

3. The distributed fabric as recited in claim 2, wherein the neighbor synchronization update message is sent by each of the one or more member nodes to update a time-to-live (TTL) value of an associated entry in the LLDP neighbors database of the master node, and wherein the neighbor synchronization update message comprises a collection of <T,R> records, where T indicates a type of update, and R indicates a corresponding record to update in the LLDP neighbors database of the master node.

4. The distributed fabric as recited in claim 1, wherein the master node is further configured to update its local LLDP neighbors database with the LLDP neighbor information included in each neighbor synchronization update message received from one of the one or more member nodes.

5. The distributed fabric as recited in claim 1, wherein the neighbor synchronization request message is sent by the master node periodically and in response to determination of one or more inconsistencies between incoming updates and the LLDP neighbors database of the master node.

6. The distributed fabric as recited in claim 5, wherein the neighbor synchronization request message comprises a collection of <I, H> records, where I is an identifier of a neighbor to one of the member nodes, and H indicates a hash generated for that corresponding neighbor, and wherein each of the one or more member nodes are further configured to:

regenerate a hash for the corresponding neighbor; and
determine whether to send an update to the master node based on a comparison between the hash and the regenerated hash.

7. The distributed fabric as recited in claim 1, wherein the nodes are further configured to receive LLDP query messages originated from one or more northbound applications in order to gather information about LLDP neighbors from the nodes.

8. The distributed fabric as recited in claim 1, wherein the nodes are further configured to:
receive protocol data units (PDUs) using the switching processor; and
redirect the PDUs to the local processor for handling by the local processor.

9. The distributed fabric as recited in claim 1, further comprising a backup node configured to perform functions equivalent to the master node when the master node is unavailable, wherein each of the one or more member nodes is further configured to send neighbor synchronization update messages to the backup node.

10. A method for providing link layer discovery protocol (LLDP) to a distributed fabric, the method comprising:
sending a neighbor synchronization request message from a master node to one or more member nodes connected to the master node, the neighbor synchronization request message comprising a request for a recipient member node to send its LLDP neighbor information to the master node;
receiving a neighbor synchronization update message at the master node from at least one of the one or more member nodes, the neighbor synchronization update message comprising information about local LLDP neighbors of the one or more member nodes;
storing the information about the local LLDP neighbors from the at least one of the one or more member nodes in a LLDP neighbors database of the master node; and
receiving, at the master node, one or more LLDP statistics update messages from the one or more member nodes, the one or more LLDP statistics update messages comprising statistics about LLDP neighbors of the one or more member nodes,
wherein the statistics include a number of neighbors added for the one or more member nodes since initiation of LLDP in the distributed fabric.

11. The method as recited in claim 10, wherein the neighbor synchronization update message is received by the master node periodically, and during or after a change in a local LLDP neighbors database of the at least one of the one or more member nodes.

12. The method as recited in claim 11, wherein the neighbor synchronization update message comprises a collection of <T,R> records, where T indicates a type of update, and R indicates a corresponding record to update in the LLDP neighbors database of the master node.

13. The method as recited in claim 10, wherein the neighbor synchronization request message is sent by the master node periodically and in response to determination of one or more inconsistencies between incoming updates and the LLDP neighbors database of the master node.

14. The method as recited in claim 13, wherein the neighbor synchronization request message comprises a collection of <I, H> records, where I is an identifier of a neighbor to one of the member nodes, and H indicates a hash generated for that corresponding neighbor, and wherein each of the one or more member nodes determines whether to send an update to the master node based on a comparison between the hash and a regenerated hash.

15. The method as recited in claim 10, further comprising receiving LLDP query messages originated from one or more northbound applications in order to gather information about LLDP neighbors from the LLDP neighbors database of the master node.

16. The method as recited in claim 10, further comprising:
distributing protocol data units (PDUs) to a switching processor of only one of the master node and the one or more member nodes; and
redirecting the PDUs to a local processor for handling instead of sending all PDUs to the master node.

17. A master node, comprising:
a local processor configured to:
manage a link layer discovery protocol (LLDP) neighbors database, the LLDP neighbors database being configured to store information regarding networking devices in a distributed fabric;
receive neighbor synchronization update messages from one or more member nodes in the distributed fabric, each neighbor synchronization update message comprising information about local LLDP neighbors of the one or more member nodes;
send a neighbor synchronization request message to the one or more member nodes, the neighbor synchronization request message comprising a request for a recipient member node to send its LLDP neighbor information to the master node;
update the LLDP neighbors database with the LLDP neighbor information included in each neighbor synchronization update message received from one of the one or more member nodes; and
receive one or more LLDP statistics update messages from the one or more member nodes, the one or more LLDP statistics update messages comprising statistics about LLDP neighbors of the one or more member nodes, wherein the statistics include a number of neighbors added for the one or more member nodes since initiation of LLDP in the distributed fabric; and
a switching processor configured to:
receive and send packets;
receive protocol data units (PDUs); and
redirect the PDUs to the local processor for handling,
wherein the neighbor synchronization request message is sent by the master node periodically and in response to determination of one or more inconsistencies between incoming updates and the LLDP neighbors database of the master node.

18. The master node as recited in claim 17, wherein the local processor is further configured to update a time-to-live (TTL) value of an associated entry in the LLDP neighbors database of the master node using each of the neighbor synchronization update messages, and wherein the neighbor synchronization update message each comprise a collection of <T,R> records, where T indicates a type of update, and R indicates a corresponding record to update in the LLDP neighbors database of the master node.

19. A member node, comprising:
a local processor configured to:
manage a link layer discovery protocol (LLDP) neighbors database, the LLDP neighbors database being configured to store information regarding LLDP neighbor devices directly connected to a switching processor of a member node in a distributed fabric;

send neighbor synchronization update messages to a master node in the distributed fabric, the neighbor synchronization update message comprising information about local LLDP neighbors of the member node; and receive a neighbor synchronization request message from the master node, the neighbor synchronization request message comprising a request for the member node to send its LLDP neighbor information to the master node; and send one or more LLDP statistics update messages to the master node, the one or more LLDP statistics update messages comprising statistics about LLDP neighbors of the member node, wherein the statistics include a number of neighbors added for the member node since initiation of LLDP in the distributed fabric; and a switching processor configured to:
receive and send packets;
receive protocol data units (PDUs); and
redirect the PDUs to the local processor for handling instead of sending the PDUs to the master node, wherein the neighbor synchronization update messages are sent by the member node periodically, and during or after a change in the LLDP neighbors database of the member node.

20. The member node as recited in claim 19, wherein the neighbor synchronization update message each comprise a collection of <T,R> records, where T indicates a type of update, and R indicates a corresponding record to update in a LLDP neighbors database of the master node.

* * * * *